(12) United States Patent
Somnitz et al.

(10) Patent No.: US 9,656,357 B2
(45) Date of Patent: May 23, 2017

(54) METHOD AND DEVICE FOR DIRECTLY SCREWING TOGETHER AT LEAST TWO COMPONENTS WITHOUT A PILOT HOLE USING A HOLDING DOWN CLAMP

(71) Applicant: Bayerische Motoren Werke Aktiengesellschaft, Munich (DE)

(72) Inventors: Andreas Somnitz, Wildberg (DE); Manuel Kaiser, Rutesheim (DE); Maximilian Wilhelm, Bockhorn (DE); Andreas Forster, Oberviechtach (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/639,291

(22) Filed: Mar. 5, 2015

(65) Prior Publication Data

US 2015/0174714 A1 Jun. 25, 2015

Related U.S. Application Data

(63) Continuation of application No. PCT/DE2013/000488, filed on Aug. 23, 2013.

(30) Foreign Application Priority Data

Sep. 7, 2012 (DE) .......................... 10 2012 215 908

(51) Int. Cl.
*B23P 19/06* (2006.01)
*B21J 15/02* (2006.01)
(Continued)

(52) U.S. Cl.
CPC ............ *B23P 19/06* (2013.01); *B21J 15/027* (2013.01); *B29C 65/48* (2013.01); *B29C 65/562* (2013.01);
(Continued)

(58) Field of Classification Search
CPC . B23P 19/06; B29C 66/929; B29C 66/92445; B29C 66/8322; B29C 66/21;
(Continued)

(56) References Cited

U.S. PATENT DOCUMENTS 6,543,115 B1    4/2003  Mauer et al.
7,475,473 B2 *  1/2009  Lang .................... B21D 39/031
                                                    227/152

(Continued)

FOREIGN PATENT DOCUMENTS

CN    201079875 Y    7/2008
CN    201300266 Y    9/2009
(Continued)

OTHER PUBLICATIONS

German Search Report dated Jun. 21, 2013 with partial English-language translation (Ten (10) pages).
(Continued)

*Primary Examiner* — John C Hong
(74) *Attorney, Agent, or Firm* — Crowell & Moring LLP

(57) ABSTRACT

A method and device are provided for directly screwing together at least two components using a self-drilling and tapping screw which has a head and a shank formed onto the head with a self-tapping thread section and a hole-drilling section for flow drilling. The components are held pressed against one another by a holding down clamp while the screw is screwed in. The holding down force, with which the holding down clamp presses the components against one another while the screw is screwed in, is varied.

12 Claims, 1 Drawing Sheet

(51) Int. Cl.
*F16B 25/00* (2006.01)
*F16B 25/10* (2006.01)
*B29C 65/48* (2006.01)
*B29C 65/56* (2006.01)
*B29C 65/72* (2006.01)
*B29C 65/78* (2006.01)
*B29C 65/00* (2006.01)
*F16B 11/00* (2006.01)

(52) U.S. Cl.
CPC .......... *B29C 65/72* (2013.01); *B29C 65/7841* (2013.01); *B29C 66/1122* (2013.01); *B29C 66/21* (2013.01); *B29C 66/41* (2013.01); *B29C 66/721* (2013.01); *B29C 66/7212* (2013.01); *B29C 66/7422* (2013.01); *B29C 66/74283* (2013.01); *B29C 66/8322* (2013.01); *B29C 66/929* (2013.01); *B29C 66/92445* (2013.01); *F16B 25/0021* (2013.01); *F16B 25/0031* (2013.01); *F16B 25/106* (2013.01); *F16B 11/006* (2013.01); *Y10T 29/49963* (2015.01); *Y10T 29/53678* (2015.01)

(58) Field of Classification Search
CPC .............. B29C 66/74283; B29C 65/72; B29C 66/7422; B29C 65/48; B29C 65/7841; B29C 66/7212; B29C 66/1122; B29C 65/562; B29C 66/721; B29C 66/41; F16B 25/106
See application file for complete search history.

(56) References Cited

U.S. PATENT DOCUMENTS

| | | | |
|---|---|---|---|
| 8,230,566 B2 * | 7/2012 | Oguri | B25B 27/062 254/98 |
| 2002/0051695 A1 | 5/2002 | Friederich et al. | |
| 2004/0235576 A1 | 11/2004 | Friederich et al. | |

FOREIGN PATENT DOCUMENTS

| | | | |
|---|---|---|---|
| CN | 101596625 | A | 12/2009 |
| CN | 102000970 | A | 4/2011 |
| DE | 39 09 725 | C1 | 9/1990 |
| DE | 197 52 367 | A1 | 5/1999 |
| DE | 198 19 721 | A1 | 11/1999 |
| DE | 103 48 427 | A1 | 5/2005 |
| EP | 0 712 678 | A1 | 5/1996 |
| EP | 1 109 637 | B1 | 5/2004 |
| EP | 1 466 990 | A1 | 10/2004 |

OTHER PUBLICATIONS

International Search Report (PCT/ISA/210) dated Dec. 4, 2013 with English-language translation (Four (4) pages).

Chinese-language Office Action issued in counterpart Chinese Application No. 201380038554.4 dated May 4, 2016 with English translation (9 pages).

* cited by examiner

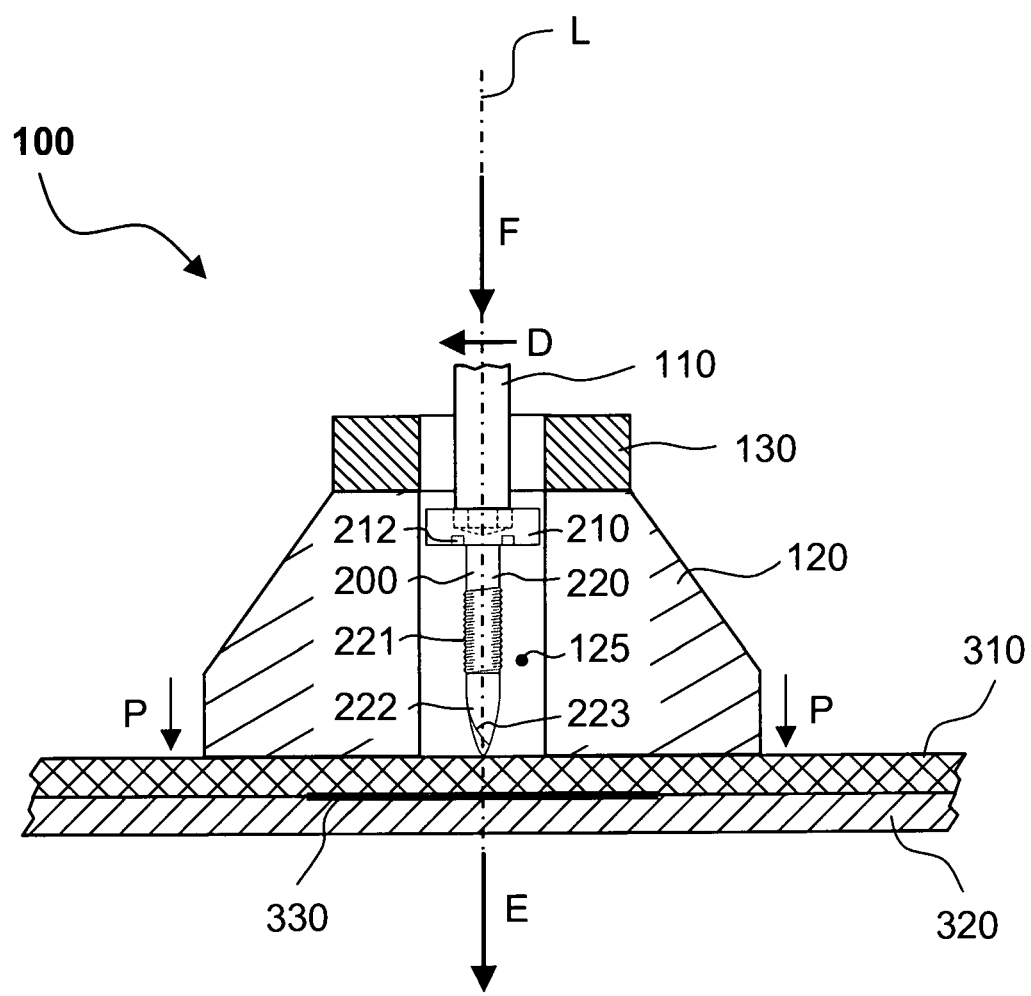

METHOD AND DEVICE FOR DIRECTLY SCREWING TOGETHER AT LEAST TWO COMPONENTS WITHOUT A PILOT HOLE USING A HOLDING DOWN CLAMP

CROSS REFERENCE TO RELATED APPLICATIONS

This application is a continuation of PCT International Application No. PCT/DE2013/000488, filed Aug. 23, 2013, which claims priority under 35 U.S.C. §119 from German Patent Application No. 10 2012 215 908.8, filed Sep. 7, 2012, the entire disclosures of which are herein expressly incorporated by reference.

BACKGROUND AND SUMMARY OF THE INVENTION

The invention relates to a method for directly screwing together at least two components using a hole-drilling and thread-cutting screw, the components being pressed against one another by means of a holding down clamp during the screwing-in operation.

Furthermore, the invention relates to a device for carrying out the method.

The term "directly screwing together" is understood to mean the production of a screw connection between at least two components to be joined without the previous introduction of holes or bores (what are known as pilot holes) into said components. In the case of directly screwing together, both the effort required producing the pilot holes and the effort required to find the holes during the alignment of the components to be joined are eliminated.

In the context of the invention, the direct screwing operation is to take place by way of a hole-drilling and thread-cutting screw. The screw has a head and a shank which is integrally formed on the head. The shank includes a self-tapping threaded section and a hole-drilling section for flow drilling. In the case of what is known as "flow drilling screw connecting," the hole-drilling and thread-cutting screw, which is configured specifically for this purpose, is pressed with its hole-drilling section at the connecting point or screwing-in point against the components which are to be joined together, are aligned with respect to one another and are not pilot drilled, and is set in rotation. As a consequence of the friction which is produced, the connecting point is heated locally, which makes plasticization of the component materials possible, which are thereupon plastically deformed and finally penetrated in the radial and in the axial direction by way of the hole-drilling section. Here, what is known as a passage (also called a flow-drilled hole) is also formed on at least one of the components to be joined, into which passage subsequently the self-tapping threaded section of the hole-drilling and thread-cutting screw engages and produces a non-positive and positively locking connection between the components. Single-sided accessibility at the connecting point is advantageously sufficient.

A hole-drilling and thread-cutting screw for flow drilling is known from DE 39 09 725 C1.

In the case of directly screwing together, as explained in the preceding text, an undesired and disadvantageous gap formation can occur between the components on account of the plastic deformation of the component materials. In order to prevent a gap formation of this type, DE 103 48 427 A1 proposes the use of a holding down clamp which presses the components against one another during the screwing-in operation. The formation of a gap between the components is to be prevented by way of the holding down force which is active.

The invention is based on the object of specifying a method of the type mentioned at the outset which meets new requirements and which does not have, or at least has only to a reduced extent, the disadvantages which are associated with the prior art.

This and other objects are achieved by way of a method and device according to the invention.

The method according to the invention for directly screwing together at least two components without a pilot hole using a hole-drilling and thread-cutting screw which has a head and a shank which is integrally formed on the head with a self-tapping threaded section and a hole-drilling section for flow drilling, the components being pressed against one another by way of a holding down clamp (at the connecting point or screwing-in point) during the screwing-in operation, provides that the force (or holding down force), with which the holding down clamp presses the components against one another during the screwing-in operation, is varied during the screwing-in operation.

A "varying holding down force" is understood to mean that the holding down force, with which the holding down clamp presses or squeezes the components against one another during the screwing-in operation, is not constant, but rather changes over the screwing-in travel, which is effected, in particular, according to a defined or preset force-displacement profile.

It is the idea here that the holding down clamp does not press against the components during the entire screwing-in operation with the maximum required holding down force or pressing force for preventing a gap formation, but rather only at the correct time or during a comparatively short time period, as a result of which the components and, in particular, the upper component, on which the holding down clamp acts directly (or optionally also indirectly), are protected. As a result, in particular, components made from sensitive component materials or base materials can be protected and surface damage on the upper component can be prevented or at least minimized.

It is particularly preferably provided that the holding down force is highest or reaches its highest value (maximum) during the formation of a flow-drilled hole in the lower component, since the tendency for gap formation as a result of displaced component material is particularly high in this screwing-in phase. However, the holding down force can also reach its maximum, or a second maximum, toward the end of the screwing-in operation, as will be explained in greater detail in the following text.

The components to be screwed together are, in particular, individual parts or structural components for a motor vehicle body, such as metal panels or panel-like structures and profiles (which can be present as semifinished products or as three-dimensionally shaped components), and physical structures such as cast parts and the like.

It is preferably provided that the uppermost component, on which the holding down clamp is seated directly, is formed from a non-metallic material or substance, such as from a fiber-reinforced plastic (FRP) and, in particular, from a carbon fiber-reinforced plastic (CRP). In particular, the method according to the invention proves very advantageous for this purpose, since excessive temporary pressure loading on the upper component is avoided. It is preferably provided that the holding down force is maximum during the screwing-in operation only when this is absolutely necessary in order to prevent a gap formation and assumes a lower value during the other screwing-in phases (and can even assume the value zero, that is to say, no holding down force). Furthermore, damage to the upper component caused by the hole-drilling and thread-cutting screw, such as ripping out and chipping of material, can also be prevented or at least minimized in this case by way of a holding down clamp. The holding down clamp can therefore have multiple advantageous effects.

The holding down force can preferably be varied in the range from 0 N to 2000 N during the screwing-in operation. In the case of a holding down force of 0 N, the components are not pressed together at the connecting point. The holding down force can also assume a value of less than 0 N, as a result of which, for example, drawing back of the holding down clamp is made possible. It is particularly preferably provided that the holding down force is varied in the range from 100 N to 2000 N and, in particular, in the range from more than 1000 N to 2000 N.

Furthermore, it is preferably provided that the holding down clamp acts on the upper component in an, in particular, circularly annular area relatively tightly, in particular as tightly as technically possible, around the connecting point or the screwing-in point. It is particularly preferably provided here that the circularly annular area is as great as possible, with the result that the surface pressure which results from the holding down force which is applied is at a low level and damage to the components and, in particular, to the upper component (for example, pressing of the holding down clamp into the surface) is prevented or at least minimized. A great circularly annular area is distinguished, for example, by the fact that its radial annular width (radial spacing between the inner circle and the outer circle) corresponds to from 2 times to 10 times and, in particular, from 3 times to 7 times the head diameter of the hole-drilling and thread-cutting screw which is used. It is particularly preferably provided that the circularly annular area has an external diameter in the range from 20 mm to 60 mm, in particular depending on the head diameter of the screw. The contact area of the holding down clamp can also be configured with a different shape, that is to say such that it is not circularly annular. Furthermore, the holding down clamp can be configured on its contact face with a protective coating or the like for protection of the components and, in particular, the upper component.

It is preferably provided that the hole-drilling section of the hole-drilling and thread-cutting screw is configured specifically for the introduction of a hole into the upper component. The introduction of a hole into the upper component can be effected by way of forming or inward forming (that is to say, by way of plastic material displacement) and/or by way of cutting or incising (that is to say, material severing and/or by way of chip removal, rasping, rupturing and the like).

It is particularly preferably provided that the hole-drilling and thread-cutting screw which is used has at least one cutting edge or the like on its hole-drilling section, which cutting edge makes the introduction or production and, in particular, incision of a hole, in particular into the upper component, possible during rotation of the screw in one rotational direction and which permits the flow drilling, in particular in the lower component, during rotation of the screw in the other or in the opposite rotational direction. The at least one cutting edge on the hole-drilling section makes it possible, by way of rotation of the screw first of all in one rotational direction, to produce or form a hole with the removal of material or optionally also without the removal of material, in particular into the upper component, the holding down clamp having an assisting function here. By way of subsequent rotation of the screw in the opposite rotational direction, a flow-drilled hole can be formed with the same hole-drilling section, in particular in the lower component, into which flow-drilled hole subsequently the self-tapping threaded section can engage, as explained at the outset. In this way, in particular, components made from different materials (for example, FRP or CRP components and metal components, as will be explained in greater detail in the following text) can also be joined mechanically (composite construction).

The upper component can be formed from a non-metallic material or substance, preferably from a material which cannot be deformed plastically or can be deformed plastically only with difficulty, and, in particular, from a brittle material. The upper component is particularly preferably formed from a fiber-reinforced plastic (FRP) and, in particular, from a carbon fiber-reinforced plastic (CRP), as described above. The lower component can be formed from a metallic material and preferably from a plastically deformable or ductile component material. The lower component is particularly preferably formed from aluminum or steel.

The components to be screwed together can be additionally adhesively bonded to one another at least in the region of the screwing-in point. In precisely this operation, direct screwing together proves particularly advantageous, since special precautions are not required, such as keeping a pilot hole region free from adhesive, which leads to an interruption of the adhesive seam or adhesive area and therefore to strength and/or durability losses. Contamination of the production system or its tools by way of adhesive which escapes is also dispensed with. By way of the use of a holding down clamp, as proposed, the strength and/or resistance of the adhesive bond which is produced between the components can additionally be improved. It can be advantageous for this purpose that the holding down force is increased again or reaches its maximum toward the end of the screwing-in operation. As a result, what is known as breathing of the components with the formation of a gap can be prevented effectively.

The device according to the invention for carrying out the method according to the invention comprises at least:
  a screwing spindle, by way of which a pressure force and a torque, with an associated rotation of the screw, can be applied to the hole-drilling and thread-cutting screw which is to be screwed in during the screwing-in operation; and
  a holding down clamp which is configured in such a way that it can apply a variable holding down force on the upper component during the screwing-in operation.

It is preferably provided that the device according to the invention has at least one adjustable or controllable actuating drive for the holding down clamp, which actuating drive serves to generate a holding down movement and/or a holding down force. It is preferably an electromechanical actuating drive. Instead of an electromechanical actuating drive, as an alternative or in addition, a hydraulic and/or pneumatic actuating drive can also be provided. It is provided, in particular, that said actuating drive can be controlled electronically or optionally also hydraulically or pneumatically by way of a control device which belongs to the device in order to set, control or change the holding down force during the screwing-in operation.

Furthermore, a regulation of the holding down force and/or the angular velocity or rotational speed of the screwing spindle can also be provided during the screwing-in operation. The holding down force can also be set or regulated during the screwing-in operation depending on the axially acting screwing force (this is the pressure force which is applied to the screw in the axial direction by the screwing spindle during the screwing-in operation), it being possible for the axially acting screwing force (also called bit force) to be variable and, in particular, controlled, regulated during the screwing-in operation itself.

Furthermore, it is preferably provided that the screwing spindle and, in particular, also its drive devices are designed or configured, in addition to the option for varying the rotational speed and/or the torque which is applied to the screw, for selective right-hand/left-hand running or for a reversal in rotational direction and, in particular, for rapidly changing right-hand/left-hand running. The rotational speed of the screwing spindle preferably lies in the range from 100 to 7000 revolutions per minute and can also be changed and/or regulated in said range.

In the following text, the invention will be explained in greater detail by way of example and in a manner which is not restrictive using a diagrammatic FIGURE which is not true to scale. Independently of specific feature combinations, the features which are shown in the FIGURE and/or are explained in the following text can be general features of the invention.

Other objects, advantages and novel features of the present invention will become apparent from the following detailed description of one or more preferred embodiments when considered in conjunction with the accompanying drawing.

BRIEF DESCRIPTION OF THE DRAWING

FIG. 1 is a diagrammatic sectional view of a device according to an embodiment of the invention.

DETAILED DESCRIPTION OF THE DRAWING

FIG. 1 shows a device 100 for directly screwing together at least two components 310 and 320 using a hole-drilling and thread-cutting screw 200. The screw 200 has a head 210 and a shank or bolt 220 which is integrally formed on the head 210. A self-tapping threaded section 221 is configured on the shank 220. The self-tapping threaded section 221 is, in particular, a self-channeling (or, as an alternative, a self-cutting) threaded section. In the region of its free axial end, the shank 220 is configured with a hole-drilling section 222 for flow drilling. The hole-drilling section 222 has a rounded screw tip and a plurality of cutting edges 223.

The upper component 310 (first joining partner) is formed from a fiber-reinforced plastic, such as a carbon fiber-reinforced plastic. The lower component 320 (second joining partner) is formed from an aluminum material or steel material. The sheet-like design is shown here merely as an example. An optional adhesive layer 330 is arranged between the components 310 and 320 at the connecting or screwing-in point.

The device 100 includes a screwing spindle 110, by way of which a pressing force F and a torque, with an associated rotation having the rotational direction D (right-hand running), can be applied to the hole-drilling and thread-cutting screw 200 which is to be screwed into the components 310 and 320. The screwing spindle 110 can also serve to secure and/or fix the screw 200 during preparation of the screwing-in operation. The force loading and the rotary drive of the screwing spindle 110 can be effected by way of drive devices (not shown; for example by way of an electric motor and a feed unit known to those skilled in the art).

Furthermore, the device 100 includes a holding down clamp 120 which presses the components 310 and 320 onto one another or against one another during the screwing-in operation, to which end the holding down clamp 120 acts on the upper component 310, in particular, in a circularly annular area tightly around the connecting point or screwing-in point. The sleeve-like inner recess 125 in the holding down clamp 120 can serve to guide the screw 200, in particular during the preparation of the screwing-in operation. However, the screwing spindle 110 is also received and guided axially in said inner recess at least during the screwing-in operation.

The holding down clamp 120 can be configured in one piece or in multiple pieces. A multiple-piece configuration of the holding down clamp 120 makes simple adaptation to different screw types and screwing-in processes possible. Reference numeral 130 denotes an actuating drive for the holding down clamp 120 which serves to generate a holding down movement and/or a holding down force P, with which the holding down clamp 120 is pressed onto the upper component 310. In particular, it is an electromechanical or optionally also a pneumatic or hydraulic actuating drive 130. A template or the like which belongs to the device 100 and on which the lower component 320 can lie during the screwing-in operation is not shown. Furthermore, on its underside which forms the contact face, the holding down clamp 120 can be provided with a protective covering, protective coating or the like (for example, an elastomer or the like), in order to protect the upper component 310.

The illustration which is shown in FIG. 1 shows the beginning of the screwing-in operation. The screwing-in direction is indicated by arrow E. Frictional heat is generated at the screwing-in point or connecting point by axial pressing of the screw 200 with the force F onto the upper component 310 and by simultaneous rotation D (right-hand running) of the screw 200 about the longitudinal or screwing-in axis L. The temperature, which is increased as a result at the screwing-in point, makes it possible to penetrate the components 310 and 320, without the aid of a pilot hole, with the conical or cone-shaped hole-drilling section 222. A passage or flow-drilled hole is formed on the outlet side of the lower component 320 on account of the plastic material properties. After the passage is formed, a thread is formed in the lower component 320 by way of the self-tapping threaded section 221. A mechanical connection or screw connection between the components 310 and 320 can then be produced by further screwing in of the screw 200. Finally, the screwing-in operation is concluded by tightening of the screw 200 with a defined torque, the connecting point still cooling subsequently, the thread which is formed in the lower component 320 bearing particularly tightly against the self-tapping threaded section 221 of the screw 200. The axial pressing or feed force F, the torque and/or the angular velocity are typically varied during the screwing-in operation.

The individual phases of the screwing-in operation are also explained clearly in DE 103 48 427 A1. Otherwise, a threaded engagement can also occur between the screw 200 and the upper component 310. In order to accommodate rising component material, the head 210 of the screw 200 can be configured on its underside with a groove (or recess or under-head groove) 212 which runs around the shank 220.

It can be provided that the screw 200 is configured on its hole-drilling section 222 with at least one cutting edge 223 which makes it possible to introduce and, in particular, cut a hole into the upper component 310 by way of rotation of the screw 200 in the opposite rotational direction-D (that is to say, left-hand running). Approximately when the screw tip on the hole-drilling section 222 comes into contact with the lower component 320, the rotational direction is reversed and the further screwing-in operation is effected as explained in the above text (that is to say, right-hand running) Here, the right-hand running and left-hand running can also be swapped. For this purpose, the spindle device 110 and its drive devices are designed for right-hand/left-hand running and/or for a reversal of rotational direction.

In order to avoid forming a gap between the components 310 and 320 during the screwing-in operation, the holding down clamp 120 is provided. The holding down force P, which is applied by way of the holding down clamp 120 to the upper component 310 for the purpose of pressing the components 310 and 320 against one another, varies, that is to say is not constant. The holding down clamp 120 is therefore not pressed against the upper component 310 during the entire screwing-in operation with the maximum required holding down force or pressing force P in order to prevent a gap formation, but rather only at the correct time or during a comparatively short time period.

It is preferably provided that the holding down force P is highest or reaches its highest value (maximum) during the formation of the flow-drilled hole in the lower component 320, since the tendency for gap formation is particularly high in the screwing-in phase. However, the holding-down force P can also achieve its maximum, or a second maximum, toward the end of the screwing-in operation, which is advantageous, in particular, when the components 310 and 320 are additionally adhesively bonded, as explained in the above text. The actuating drive 130 is designed for generating a varying holding down force P. The control of a varying holding down force P can be brought about by way of a control device (not shown), an electronic or optionally also a pneumatic or hydraulic controller being provided, in particular.

For example, mechanical composite construction connections of fiber-reinforced plastics (FRP) and, in particular, of carbon fiber-reinforced plastics (CRP) with metal materials by use of direct screwing together without a pilot hole can be produced by way of the method according to the invention and/or by way of the device 100 according to the invention (although drilling a pilot hole is certainly also possible). Moreover, damage to the FRP or CRP components is prevented or at least minimized. That is to say, the attachment of FRP or CRP components to steel and aluminum components (or the like) by way of mechanical joining technology without a pilot hole is made possible. In contrast to many other joining techniques, single-sided accessibility is sufficient.

More than two components can also be joined by way of the method according to the invention and/or by way of the device 100 according to the invention. Furthermore, the invention is not restricted to the described component materials or substances and material combinations.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for directly screwing together at least first and second components using a hole-drilling and thread-cutting screw, the screw having a head and a shank integrally formed on the head, which shank includes a self-tapping threaded section and a hole-drilling section for flow drilling, the method comprising the acts of:

pressing the first and second components against one another via a holding down clamp during the directly screwing together of the at least first and second components; and varying a holding down force with which the holding down clamp presses the first and second components against one another during the directly screwing together of the at least first and second components; and coupling at least one adjustable actuating drive with the holding down clamp, said adjustable actuating drive being electronically controlled via a control device in order to control the varying holding down force.

2. The method according to claim 1, wherein an upper one of the first and second components is formed of a non-metallic material, the method further comprising the act of seating the holding down clamp directly on the upper component.

3. The method according to claim 2, wherein the non-metallic material is a fiber-reinforced plastic.

4. The method according to claim 2, wherein the non-metallic material is a carbon-fiber-reinforced plastic.

5. The method according to claim 2, wherein the holding down force is at a highest value during formation of a flow-drilled hole in a lower one of the first and second components during the directly screwing together operation.

6. The method according to claim 2, wherein the holding down clamp acts on the upper component in a circularly annular area located tightly around a screwing-in point of the screw.

7. The method according to claim 1, wherein the holding down force is at a highest value during formation of a flow-drilled hole in a lower one of the first and second components during the directly screwing together operation.

8. The method according to claim 1, wherein the holding down force is varied in a range of from 0 N to 2000 N during the directly screwing together operation.

9. The method according to claim 1, wherein the hole-drilling and thread-cutting screw has at least one cutting edge on the hole-drilling section, the method further comprising the act of:

producing a hole via the cutting edge during rotation of the screw in one rotational direction during the directly screwing together operation and permitting flow drilling during rotation of the screw in another rotational direction.

10. The method according to claim 1, further comprising the act of:

adhesively bonding the first and second components to one another at least in a region of a screwing-in point of the screw.

11. A device for directly screwing together at least first and second components using a hole-drilling and thread-cutting screw having a head and a shank integrally formed on the head, the shank having a self-tapping threaded section and a hole-drilling section for flow drilling, the device comprising:

a screwing spindle configured to apply a pressure force and torque to the hole-drilling and thread-cutting screw to be screwed into the components during the directly screwing together operation;

a holding down clamp configured to press the first and second components against one another during the directly screwing together operation, the holding down clamp being configured to apply a variable holding down force on an upper one of the first and second components during the directly screwing together operation; and at least one adjustable actuating drive operatively coupled with the holding down clamp, said adjustable actuating drive being electronically controlled via a control device in order to control the varying holding down force.

12. The device according to claim 11, wherein the screwing spindle is configured for selective right-hand and left-hand running operation.

* * * * *